(12) United States Patent
Islinger et al.

(10) Patent No.: US 10,875,417 B2
(45) Date of Patent: Dec. 29, 2020

(54) THERMAL FEEDBACK FOR POWER TRANSFER OPTIMIZATION

(71) Applicant: WiTricity Corporation, Watertown, MA (US)

(72) Inventors: Simon Islinger, Munich (DE); Leandro Alberto Percebon, Munich (DE); Stefan Raabe, Unterhaching (DE); Martin Pavlovsky, Munich (DE)

(73) Assignee: WiTricity Corporation, Watertown, MA (US)

( * ) Notice: Subject to any disclaimer, the term of this patent is extended or adjusted under 35 U.S.C. 154(b) by 110 days.

(21) Appl. No.: 16/246,985

(22) Filed: Jan. 14, 2019

(65) Prior Publication Data

US 2019/0241087 A1     Aug. 8, 2019

Related U.S. Application Data

(60) Provisional application No. 62/638,385, filed on Mar. 5, 2018, provisional application No. 62/627,131, filed on Feb. 6, 2018.

(51) Int. Cl.
*B60L 53/62*     (2019.01)
*H02J 50/12*     (2016.01)
(Continued)

(52) U.S. Cl.
CPC ............ *B60L 53/62* (2019.02); *B60L 53/12* (2019.02); *B60L 53/302* (2019.02);
(Continued)

(58) Field of Classification Search
CPC . B60L 53/62; B60L 53/12; H02J 50/12; H02J 50/80; B60Y 2300/91; B60Y 2300/92; H01F 2027/406
See application file for complete search history.

(56) References Cited

U.S. PATENT DOCUMENTS 9,623,758 B2 *   4/2017   Yuasa .................. B60L 11/182
2010/0109604 A1   5/2010   Boys et al.
(Continued)

FOREIGN PATENT DOCUMENTS

EP          3185392       6/2017
WO       2019156781     8/2019

OTHER PUBLICATIONS

"International Search Report and Written Opinion", PCT Application No. PCT/US2019/013589, dated Apr. 24, 2019, 15 pages.
(Continued)

*Primary Examiner* — Jeffrey M Shin
(74) *Attorney, Agent, or Firm* — Colby Nipper PLLC

(57) ABSTRACT

Systems and methods are described for thermal feedback for power transfer optimization. Aspects include a wireless power-transfer system including a base power-transfer apparatus, a power supply unit, at least one temperature sensor, and a system controller. The base power-transfer apparatus includes a coil configured to generate a magnetic field based on an electric current. The power supply unit includes switching and power electronics configured to drive the electric current in the coil. The temperature sensor(s) are configured to measure a temperature of the base power-transfer apparatus or the power supply unit. The system controller is coupled to the base power-transfer apparatus, the power supply unit, and the temperature sensor(s) and is configured to control operation of at least one of the base power-transfer apparatus or the power supply unit based on the measured temperature to shift losses and dissipate heat in the base power-transfer apparatus or the power supply unit.

27 Claims, 8 Drawing Sheets

(51) Int. Cl.
- *H02J 50/80* (2016.01)
- *H01F 38/14* (2006.01)
- *H01F 27/40* (2006.01)
- *H02J 7/02* (2016.01)
- *B60L 53/30* (2019.01)
- *B60L 53/302* (2019.01)
- *B60L 53/12* (2019.01)
- *B60K 6/28* (2007.10)

(52) U.S. Cl.
CPC .......... *B60L 53/305* (2019.02); *H01F 27/402* (2013.01); *H01F 38/14* (2013.01); *H02J 7/025* (2013.01); *H02J 50/12* (2016.02); *H02J 50/80* (2016.02); *B60K 6/28* (2013.01); *B60Y 2200/91* (2013.01); *B60Y 2200/92* (2013.01); *B60Y 2300/91* (2013.01); *H01F 2027/406* (2013.01)

(56) References Cited

U.S. PATENT DOCUMENTS

| | | |
|---|---|---|
| 2012/0025602 A1 | 2/2012 | Boys et al. |
| 2012/0025603 A1 | 2/2012 | Boys et al. |
| 2012/0119914 A1* | 5/2012 | Uchida ............... H02J 7/00309 340/584 |
| 2014/0021914 A1 | 1/2014 | Martin et al. |
| 2014/0084856 A1* | 3/2014 | Howard ................ H02J 7/0091 320/108 |
| 2014/0111151 A1 | 4/2014 | Keeling et al. |
| 2015/0170833 A1 | 6/2015 | Widmer et al. |
| 2015/0302984 A1* | 10/2015 | Kurs ................... H04B 5/0037 307/104 |
| 2017/0129344 A1 | 5/2017 | Islinger et al. |

OTHER PUBLICATIONS

"International Preliminary Report on Patentability", PCT Application No. PCT/US2019/013589, dated Aug. 20, 2020, 9 pages.

* cited by examiner

THERMAL FEEDBACK FOR POWER TRANSFER OPTIMIZATION

RELATED APPLICATIONS

This application claims the benefit of and priority to U.S. Provisional Appl. Ser. No. 62/638,385 filed on Mar. 5, 2018 and U.S. Provisional Appl. Ser. No. 62/627,131 filed on Feb. 6, 2018, the disclosures of which are incorporated herein by reference in their entirety.

FIELD

The present disclosure is related generally to wireless power transfer, and more specifically to an inductive power-transfer system, such as a wireless electric vehicle charging (WEVC) system. In particular, the present disclosure relates to thermal feedback for power transfer optimization of a wireless power transfer apparatus. The present disclosure also relates to a method of controlling a wireless power transfer apparatus based on thermal feedback.

BACKGROUND

Wireless power transfer techniques are increasingly being used to transfer power from electrical power sources to a wide range of devices from small hand-held consumer electronic devices such as mobile phones and tablets requiring a few watts of power, to electric vehicles requiring kilowatts of power. In addition to the convenience of not having to plug in a device to power it or recharge its batteries, the absence of wires and cables makes for tidier desks and parking spaces, while reducing clutter and hazards such as trip and shock hazards. In some conventional systems, power may be transferred wirelessly via a capacitive coupling or an inductive coupling, both of which offer advantages over galvanic (e.g., wired) coupling for the purpose of supplying power to a device.

Wireless power-transfer systems can be designed to operate at fixed or variable frequencies. In addition, wireless power-transfer systems can be designed to deliver anything from a few watts of power to many kilowatts from a power source across a gap between plates of a capacitor or through magnetic coupling between coils to a load. Typically, the gap is an air gap. The energy thus delivered may be used e.g., to power an electronics circuit, to drive an electric motor in an electric vehicle or to charge batteries in the electronics circuit or vehicle. Powering a cell phone or charging its battery requires a few watts, whereas powering the motor in an electric vehicle or charging the battery requires several kilowatts. The larger the battery circuit or motor, or the faster the battery is required to charge, the more power is needed to be transferred across the air gap.

Wireless power transfer techniques have developed in different fields of technology, which has resulted in different terms being used to describe essentially the same element or component. Such terms as 'magnetic resonance,' 'magnetic coupling,' 'magnetic induction,' 'inductive power transfer' and 'resonant inductive power transfer' are common. Although there are differences, these terms are generally used broadly and interchangeably to refer to systems that transfer power from a source across an air gap to a load by way of a magnetic field.

Similarly, such terms as 'magnetic coils', 'induction coils' and 'antennas' are used essentially interchangeably to describe the parts of a wireless power system that transfer energy across the air gap.

Wireless power-transfer systems may use magnetic coils either alone or coupled with other tuned or tunable elements. In electric vehicle power transfer applications, a base power-transfer apparatus may include a coil in combination with associated driving electronics or it may include the coil with some or all the associated electronics being provide in a separate enclosure. Either way, the coil in the base power-transfer apparatus is used to transmit power via a magnetic field. Similarly, a vehicle power-transfer apparatus may include a coil in combination with associated control electronics or it may include the coil with some or all the associated electronics being provided in a separate enclosure. Either way, the coil in the vehicle power-transfer apparatus is used to receive power via a magnetic field.

The term 'power-transfer apparatus' is used herein in a variety of different ways. It is used to identify an enclosure including the coil, e.g., the 'base power-transfer apparatus' or the 'vehicle power-transfer apparatus.' It is also used to identify the coil itself.

SUMMARY

Systems and methods are described for thermal feedback for power transfer optimization. The apparatuses may include a wireless power transfer apparatus, a base power-transfer apparatus for a wireless power transfer apparatus, a vehicle power-transfer apparatus for a wireless power-transfer apparatus, or a wireless power-transfer system. The methods may include a method of controlling a wireless power transfer apparatus based on thermal feedback for power transfer optimization. The techniques described in this document enable losses to be shifted and heat to be spread between different components of the system.

Aspects include a wireless power-transfer apparatus with temperature sensors monitoring temperature during operation of the apparatus. Using the monitored temperature, operation of the apparatus can be adjusted to optimize power transfer to a vehicle power-transfer apparatus. The adjusted operation can include selection of a power level or power mode (e.g., operational mode), such as a cool-down mode, a warm-up mode, or a full-power mode. In the warm-up mode, a coil in the apparatus is driven at a higher power level, which creates heat in the apparatus. In the cool-down mode, the coil is driven at a lower power level, which allows heat generated in the apparatus to be dissipated.

In at least one aspect, a wireless power-transfer system is disclosed. The wireless power-transfer system comprises a base power-transfer apparatus, a power supply unit, at least one temperature sensor, and a system controller. The base power-transfer apparatus includes a coil configured to generate a magnetic field based on an electric current. The power supply unit includes switching and power electronics configured to drive the current in the coil. The at least one temperature sensor is configured to measure a temperature of the base power-transfer apparatus or the power supply unit. The system controller is coupled to the base power-transfer apparatus, the power supply unit, and the at least one temperature sensor. The system controller is configured to control operation of at least one of the base power-transfer apparatus or the power supply unit based on the measured temperature to shift losses and dissipate heat in the base power-transfer apparatus or the power supply unit.

In an aspect, a method of controlling power transfer between a base power-transfer apparatus and a vehicle power-transfer apparatus is disclosed. The method includes measuring a temperature of at least one component of the base power-transfer apparatus or the vehicle power-transfer apparatus by using at least one temperature sensor. The method also includes comparing the measured temperature to a temperature range defined by a lower temperature value and an upper temperature value. The method further includes controlling operation of the at least one component of the base power-transfer apparatus or the vehicle power-transfer apparatus by varying power delivered to the at least one component based on a result of the measured temperature being compared to the temperature range.

In some aspects, a wireless power-transfer system is disclosed. The wireless power-transfer system comprises a vehicle power-transfer apparatus of an electric vehicle, a vehicle control unit, one or more temperature sensors, and a system controller. The vehicle power-transfer apparatus includes a coil configured to convert a magnetic field into an electric current. The vehicle control unit is coupled to the vehicle power-transfer apparatus and includes switching and power electronics configured to use the electric current to charge a battery of the electric vehicle. The one or more temperature sensors are coupled to the vehicle power-transfer apparatus and configured to measure a temperature of the vehicle power-transfer apparatus. The system controller is coupled to the vehicle power-transfer apparatus, the vehicle control unit, and the one or more temperature sensors. The system controller is configured to control operation of at least one of the vehicle power-transfer apparatus or the vehicle control unit based on the measured temperature to shift losses and spread heating effects between different components of the vehicle power-transfer apparatus or the vehicle control unit.

In at least one aspect, a wireless power-transfer system is disclosed. The wireless power-transfer system includes a coil, ferrite, and a power supply unit. The coil is configured to generate a magnetic field based on an electric current. The ferrite is disposed proximate to the coil and configured to direct the magnetic field. The power supply unit is coupled to the coil and configured to drive the coil with the electric current. The wireless power-transfer system also includes a measuring means for measuring a temperature at one or more locations on the ferrite or at the power supply, and a controlling means for varying operation of the coil or the power supply based on the measured temperature.

DETAILED DESCRIPTION

The following description is given with reference to a wireless electric vehicle charging (WEVC) system. The ideas presented herein, however, can equally be applied to other wireless power-transfer systems including those designed for such applications as the charging of consumer electronics devices (e.g., cell phones and tablets) and power transfer to larger devices (e.g., laptop computers). The system as described is suitable for charging electric vehicles (EV) and plug-in hybrid electric vehicles (PHEV). The WEVC system uses alternating magnetic fields to couple power from a base power-transfer apparatus to a vehicle power-transfer apparatus to charge the vehicle's batteries. The same ideas could also be used in a dynamic wireless power-transfer system for vehicles, where power is transferred from equipment in a roadway to a vehicle as the vehicle travels along the roadway. Furthermore, while certain aspects of the following description are given with reference to a WEVC system, the same ideas and concepts may be used in other wireless power transfer systems in other applications, such as for consumer electronics or other lower power applications.

Figure 1:
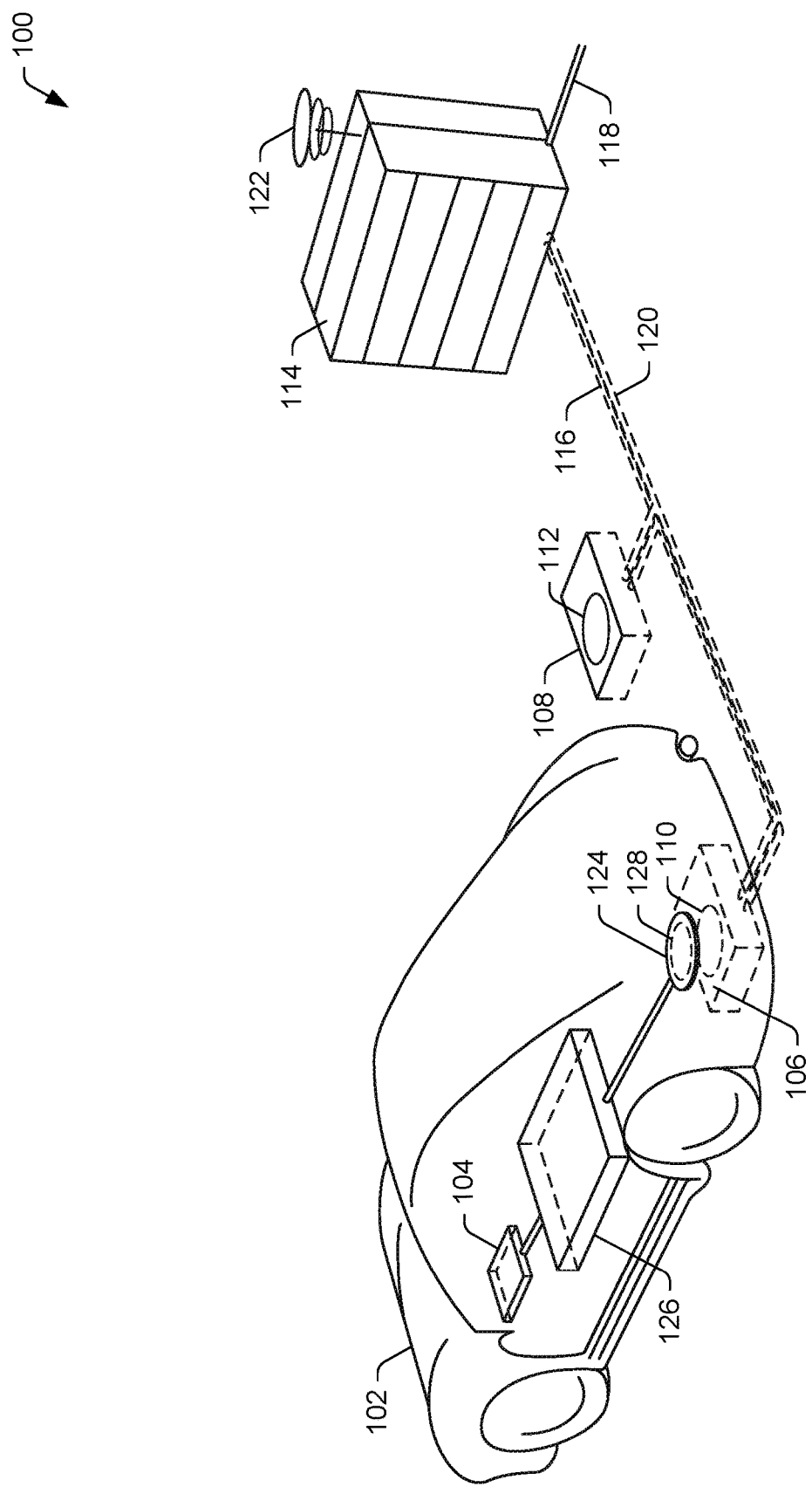
FIG. 1 is a schematic diagram of a wireless power-transfer system for charging one or more electric vehicles.

FIG. 1 is a schematic diagram of a wireless power-transfer system 100 for charging one or more electric vehicles. The wireless power-transfer system 100 enables the delivery of power to an electric vehicle 102. Such a system is also known as a wireless electric vehicle charging (WEVC) system because such systems are typically used to deliver power to charge a battery 104 in the electric vehicle 102. The power need not be delivered to the battery 104. Rather, it could be delivered to another load, such as an electric motor or other ancillary in the electric vehicle 102 while it is parked, including a heating system for cold mornings or an air conditioning system for hot days.

As shown, the system 100 allows charging while the electric vehicle 102 is parked in one of two parking spaces which each have an associated base power-transfer apparatus 106, 108. As will be described in greater detail hereinafter, each base power-transfer apparatus 106, 108 includes a coil 110, 112 which is driven by associated control circuitry (not shown in FIG. 1) to generate a magnetic field above the base power-transfer apparatus 106, 108.

Depending on specific requirements of a given implementation, the control circuitry may be supplied within the base power-transfer apparatus. Alternatively, the control circuitry may be supplied partly or wholly in a unit separate from the base power-transfer apparatus 106, 108, with the base power-transfer apparatus 106, 108 including the coil and minimal base-side control circuitry, if any, that is deemed necessary for efficient driving of the coil 110, 112. The base power-transfer apparatuses 106, 108 are typically installed on the ground surface or buried in the ground, although they may also be supplied as removable units that may simply be placed on the ground where required and moved to another location after use.

A power supply 114 coupled to the base power-transfer apparatuses 106, 108 delivers electrical power to the base power-transfer apparatuses 106, 108 via a power link 116. As shown, the power supply 114 is connected to a power network 118. In a domestic installation, the power supply 114 may be connected to a domestic power supply in place of the power network 118.

In use, the power supply 114 and the base power-transfer apparatus 106, 108 communicate via a communications link 120 which may be a wired or wireless connection. Alternatively, or additionally depending on the specifics of the installation, communication within the system 100 may be via a wireless link 122. The wireless link 122 may optionally also communicate with, e.g., a power grid management system or other external entity via a communication backhaul to manage and control power transfer from the power grid to the system or vice versa. In the illustrated example, the power link 116 and the communications link 120 may be buried. Alternatively, e.g., in a domestic setting, they may be supplied in the form of a cable or umbilicus of connections that can be plugged into the base power-transfer apparatus 106, 108 and the power supply 114.

The electric vehicle 102 includes a vehicle power-transfer apparatus 124 and associated vehicle-side control circuitry 126, which controls the transfer of energy from a coil 128 in the vehicle power-transfer apparatus 124 to the battery 104. The vehicle-side control circuitry 126 and the base-side control circuitry communicate with each other during the transfer of power between the base power-transfer apparatus 106, 108 and the vehicle power-transfer apparatus 124, as will be described in greater detail herein below.

As shown, the vehicle power-transfer apparatus 124 includes a magnetic coil 128, and the vehicle-side control circuitry 126 is located in a different location on the vehicle 102 than the coil 128. As with the base power-transfer apparatus 106, 108, this separation of the coil 128 and the control circuitry 126 is a matter of engineering design or selection depending on the specifics of the installation. The control circuitry 126 may be supplied partly or wholly in the vehicle power-transfer apparatus 124 together with the coil 128. In some vehicles it may be more convenient in terms of manufacture or servicing to combine the equipment and the coil 128 in the power-transfer apparatus 124 whereas, in other vehicles, separate units may be more suitable. Similar considerations apply to the separation or co-location of the control circuitry and the coils 110, 112 in the base power-transfer apparatus 106, 108.

Typically, the vehicle power-transfer apparatus 124 is located under the vehicle 102 near the front or rear of the vehicle 102. The exact location of the vehicle power-transfer apparatus 124 is typically determined when the vehicle 102 is being designed. This determination depends on a wide range of factors associated with the design of the vehicle 102, including the allocation of space to different functional units within the vehicle 102 that may have nothing to do with the WEVC function per se. The position may also depend on the physical size of the vehicle power-transfer apparatus 124, which depends on the amount of energy that the power-transfer apparatus is required to handle. This, in turn, is dependent to some extent on whether the vehicle is a hybrid electric vehicle with both a battery-powered motor and an internal combustion engine, or a (fully) electric vehicle where the only power source is electrical. Conveniently, the vehicle power-transfer apparatus 124 is placed on the vehicle 102 underneath and toward the front or rear of the vehicle 102 to facilitate positioning of the vehicle power-transfer apparatus 124 over the base power-transfer apparatus 106 or 108 during parking of the vehicle 102.

In use, the vehicle 102 is so positioned in a parking space that the vehicle power-transfer apparatus 124 is located over the base power-transfer apparatus 106, 108 in the parking space. When the vehicle 102 is parked as shown, with the vehicle power-transfer apparatus 124 placed over the base power-transfer apparatus 106, 108, wireless power transfer can be employed. Electrical energy in the form of an alternating current is delivered from the power supply 114 via the power link 116 to the base power-transfer apparatus 106 where it drives the coil 110. This current causes the coil 110 to create a magnetic field (Ampere's law). That field induces a voltage (Faraday's law) and an electric current in the coil 128 in the vehicle power-transfer apparatus 124, which current is used to drive a load. The current is converted into a suitable form by the control circuitry 126 and used to charge the battery 104.

It should be appreciated that the system 100 shown in FIG. 1 is a static WEVC system in that the vehicle 102, once parked, remains in place over the base power-transfer apparatus 106, 108 during charging of the battery 104. Other wireless power-transfer systems for electric vehicles allow power transfer to occur while the vehicle is being driven along a road, picking up energy from a charging track that serves a similar function to the base power-transfer apparatus 106, 108.

Usually the wireless power-transfer system 100 is designed to transfer power from the power supply 114 via the power network 118 to the base power-transfer apparatus 106 or 108, and on to the vehicle power-transfer apparatus 124. However, because of the inherent way in which magnetic wireless power-transfer functions, power could also be transferred from the battery in the vehicle to the power network 118. Further description of the operation of the wireless power-transfer system 100 focuses on power transfer from the power supply 114 to the electric vehicle 102. It should, however, be noted while considering the following description that power transfer may also happen in the reverse direction. That is to say, power may be delivered from the battery 104 in the electric vehicle 102 via the wireless power transfer units to the power supply 114 and out to the power network 118.

Figure 2:
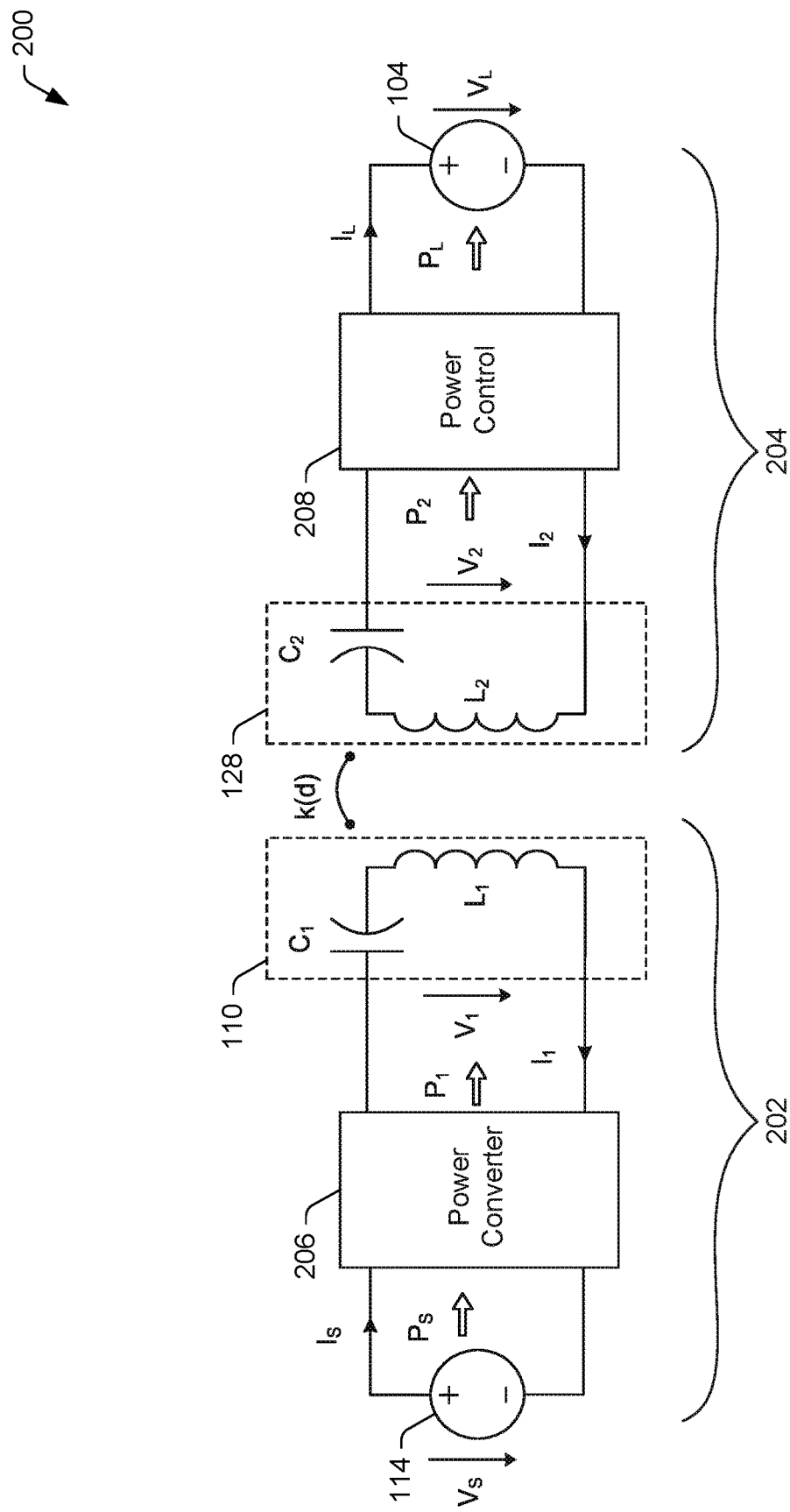
FIG. 2 is a schematic diagram of electrical elements of a wireless power-transfer system.

FIG. 2 is a schematic diagram of electrical elements of the wireless power-transfer system of FIG. 1. Electrically, the wireless power-transfer system (now renumbered as 200) comprises base-side circuitry 202 from the power supply 114 to the base-side coil 110, and vehicle-side circuitry 204 from the vehicle-side coil 128 to a load (e.g., the battery 104). The base-side circuitry 202 operates to convert energy from the power supply 114 into a suitable form to drive the base-side coil 110. The vehicle-side circuitry 204 operates to control the application of energy received by the vehicle-side coil 128 to the vehicle's battery 104.

Electrically, the base-side coil 110 is represented by inductor $L_1$ and capacitor $C_1$. The capacitor $C_1$ in series with the coil $L_1$ (as shown) or in parallel (or another mix of parallel and series components) creates an LC circuit that resonates at a given frequency. This resonance helps to optimize power transfer between the coils. Values of L and C are selected with the operating frequency of the WEVC system in mind. Similarly, the vehicle-side coil 128 is represented by inductor $L_2$ and capacitor $C_2$ with values again chosen, among other things, to achieve resonance at the operating frequency.

The power supply 114 supplies AC power $P_s$ to a power converter 206. The AC power may be supplied at local power grid voltage levels $V_s$ (e.g., domestic levels of 110 V or 220 V at 60 Hz in the US and 220 V at 50 Hz in Europe, or industrial levels and polyphase supplies for higher power implementations). The power converter 206 converts the incoming alternative current (AC) power to a power signal $P_1$ running at a system voltage $V_1$ and frequency to drive the base-side coil 110. This may be achieved by first converting the signal from the power supply $P_s$ into a direct current (DC) signal and then using a converter such as an H-bridge (not shown) to convert the DC signal into the power signal $P_1$ for the coil 110. Currently, WEVC systems are being standardized at a range of operating frequencies around ~85 kHz. In one proposed Standard the permitted range is from 81.38 kHz to 90 kHz. Defining a range allows the system to operate at different frequencies depending on different alignment conditions, helping reduce detuning effects and hence improving system efficiency.

The power converter 206 ensures that the output power signal $P_1$ is tuned and matched to the base-side coil 110. Among other things this tuning and matching aims to optimize the efficiency at which power is transferred from the power supply 114 to the base-side coil 110. The power signal has an associated current $I_1$ that flows in the coil 110. This current $I_1$ causes the coil to create a magnetic field.

In use, when the base-side coil 110 and the vehicle-side coil 128 are in close proximity (e.g., the electric vehicle is parked with the coils 110, 128 aligned and separated by an air gap of distance d) the magnetic field generated by the base-side coil 110 couples with the vehicle-side coil 128, as represented by k(d), the coupling factor at distance d. The magnetic field induces a voltage $V_2$ in the coil in the vehicle power-transfer apparatus 124 which creates a power signal $P_2$ including a current $I_2$. The current $I_2$ in the power signal $P_2$ is received by a vehicle-side power control 208, which includes tuning and matching circuitry and power conversion circuitry that converts the current $I_2$ into a form suitable for the battery 104, e.g., DC current.

Different applications of wireless power transfer are designed to fulfill different operating conditions. Whether the operating frequency of the system 200 is chosen first and values of the capacitor $C_1$ and the inductor $L_1$ are selected accordingly, or whether the values of the capacitor $C_1$ and the inductor $L_1$ are chosen first and the operating frequency is selected accordingly is, in practice, an engineering decision.

Although the coil is primarily an inductor L, it is made from a conductor that has an inherent resistance and inter-strand capacitance, with the turns of the coil also creating inter-turn capacitance. These inherent characteristics of the conductor contribute to the values of L and C in the base- and vehicle-side coils 110, 128. In some circumstances, the inherent capacitance may be sufficient to provide the required capacitance without the need for separate components or elements. In other design situations, separate capacitors or other discrete components may prove necessary.

As for the form of the coil (e.g., base-side coil 110, vehicle-side coil 128), there are numerous configurations and topologies available for use. These include such single coil arrangements as a circular, square or polygonal where the coils are wound in a substantially planar form. The coil configurations and topologies also include solenoid arrangements, in which the coil is wound around a core, and bipolar arrangements which use a coil arrangement that achieves virtually zero coupling between different parts of the coil. Additional coil configurations and topologies include multi-coil arrangements, such as a double-D ("DD") coil where the conductor follows a convoluted path that is shaped like two letters "D" alongside each other. The D-shaped portions define pole areas in the coil that allow magnetic flux to be generated at a significant height above the coil. Hybrid combinations of these are also available. Each configuration and topology offers advantages and disadvantages, and the decision of which to use depends on the application for which the system is designed.

Depending on the market, the equipment for the vehicle 102 (e.g., the vehicle power-transfer apparatus 124 and the vehicle-side control circuitry 126) and the equipment for the base (e.g., the base power-transfer apparatus 106 and the coil 110, and the power supply 114) may be made and sold by different vendors to different customers. The vehicle equipment may be sold to automobile manufacturers for incorporation into the mass-production of an electric vehicle. Or, it may be sold directly to electric vehicle owners as an after-market option. Similarly, the base equipment may be supplied to automobile manufacturers for sale with a new electric vehicle or it may be made and sold directly to electric vehicle owners. Ongoing standardization efforts are directed, among other things, to ensuring interoperability of differently designed WEVC systems. The aim is for a vehicle from any automobile manufacturer to be able to work with base equipment from any other supplier, be they automobile manufacturers or others. These factors too need to be considered when designing a WEVC system for sale to customers.

Space is also a consideration. In some applications, e.g., the apparatus in a WEVC system, and despite the relatively high power levels involved, there is a desire to make the coils as small as possible in order not to take up large areas in parking spaces and not to add weight or take up space under the vehicle. It is simpler to design a coil where the loops are laid out in a single layer, with all the loops essentially in one plane. However, as power levels increase, the size of the coil necessary to handle the higher currents similarly increases. The size of the base power-transfer apparatus 106 is limited by the size of the vehicle 102—it cannot extend outside the footprint of vehicles that may park in the space. Compliance with emission limits, e.g., to confine the magnetic field to underneath the vehicle 102, may add further constraints. The size of the vehicle power-transfer apparatus 124 is similarly limited, but it is also constrained by other parts underneath the vehicle 102—the vehicle power-transfer apparatus 124 cannot interfere with the vehicle's suspension and steering, for example. Space on a modern vehicle is at a premium, with numerous components competing to occupy locations within the vehicle.

As with any transfer of energy, high efficiency is a desirable attribute. The efficiency is a measure of the difference between the power input to the system and the power delivered to the load. Energy lost during operation of a wireless power-transfer apparatus leads to greater operating costs. Losses may have an adverse effect on the apparatus as components age faster, reducing reliability and the useful life of the apparatus. The lost energy may also cause heating of the apparatus which, in the extreme and depending on the level of power transferred, may create a fire hazard or other safety concerns.

Naturally, the aim is to be as efficient as possible. The ideal of 100% efficiency cannot be achieved for various reasons. This is true of any system. For example, a resistive, e.g., wired, power-transfer system may achieve around 95-97% efficiency. Losses of 3-5% or more of the input power are the result of ohmic ($I^2R$) losses caused by current I flowing through conductors of resistance R. In a wireless power-transfer system, in addition to ohmic losses, further energy may be lost as a result of eddy currents in the conductor induced by the time-varying magnetic field. The conductors are typically made of copper and these losses in the conductor are sometimes referred to as 'copper losses.' Despite these losses, efficiencies of around 91-95% are nevertheless possible in wireless systems depending on their design.

Power losses occur to varying degrees throughout the system, e.g., in the power electronics, the conductors, and the ferrite. One consequence of these losses is that for a given level of power (e.g., 3 kW, 6 kW, 11 kW) components must be 'larger' than they would be in a wholly efficient system. It may prove necessary to select power electronics components that are able to handle more power, and to design coils that can carry more current. Putting more power or current through the system may have an adverse effect on the apparatus as components age faster, reducing reliability and the useful life of the apparatus. The larger components may be better able to handle the extra power, making the system more reliable than would be the case if 'smaller' components were used. All of this, however, adds to the size of the equipment and results in greater costs in obtaining such components as inverters and power switches.

The frequency at which WEVC systems are designed to operate (e.g., 85 kHz frequency) can lead to an undesirable effect known as the skin effect. This is the tendency of an alternating electric current (AC) to become distributed within a conductor such that the current density is largest near the surface of the conductor and decreases with greater depths in the conductor. The electric current flows mainly at the "skin" of the conductor, between the outer surface and a level called the skin depth. This skin effect causes the effective resistance of the conductor to increase at higher frequencies where the skin depth is smaller, thus reducing the effective cross-section of the conductor.

In many wireless power transfer applications, Litz wire is used as the conductor forming the coil. Litz wire consists of many thin wire strands, individually insulated and twisted or woven together, and with groups of twisted wires being further twisted together in a prescribed pattern. This structure is configured to mitigate the aforementioned skin effects. The Litz wire is wound to form a coil of a designed form or topology. One of the effects of generating a magnetic field is the exertion of a mechanical force individually and collectively on the strands and wires. That mechanical force can lead to movement of the strands and wires, which leads to further losses in the coil.

The Litz wire or other conductor is part of a coil structure that typically includes a layer of ferrite or other magnetically permeable material (e.g., ferrite). The permeable layer interacts with the magnetic field from the conductors in order to guide the magnetic field in a desired direction by channeling magnetic flux of the magnetic field. However, the interaction of the magnetic field with the permeable layer also generates hysteresis losses. These are losses that originate in the so-called magnetic domains forming the ferrite when the domains are exposed to a time-varying magnetic field. At the microscopic level, the domains change direction at essentially the same rate as changes in the magnetic field. This movement of the domains generates heat, which is sometimes referred to as 'iron losses' in the system. A conductive backing plate, typically of aluminum, is usually included to provide further control over the magnetic field from the coil, which may create further losses as a result of eddy currents.

The efficiency at which the system operates is also dependent on alignment. Coils are designed to accommodate inaccurate positioning (displacement) where the coils are not precisely aligned with one placed exactly over the other. In a WEVC system, the coils can comfortably accommodate both lengthwise and sideways displacement (x, y) of around 100-150 mm; more if a specific system so requires. They can also accommodate significant vertical separation (z), proposed as different Standards classes Z1 (100-150 mm), Z2 (140-210 mm) and Z3 (170-250 mm). However, even with this large tolerance, efficiency decreases as displacement increases.

Figure 3:
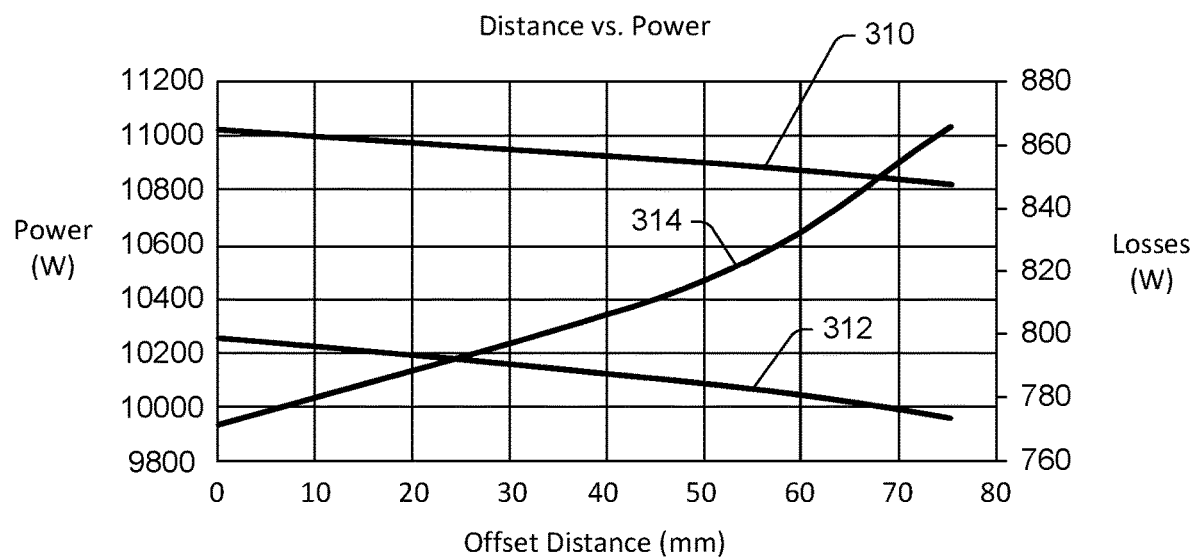
FIG. 3 is a graph representing power transfer against positional offset in a wireless power-transfer system.

An example of this efficiency degradation is shown in FIG. 3, which illustrates a graph 300 representing power transfer against positional offset in a wireless power-transfer system. The graph 300 represents power against offset distance in the x-direction between the coils (e.g., base-side coil 110 and vehicle-side coil 128). The plots would be similar in the y-direction. The upper line 310 represents power input to the system and the lower line 312 represents power output from the system to the battery or other load. Line 314 represents losses within the system, e.g., the difference between input and output power. As illustrated, losses increase with the offset distance. In addition, power transfer is optimized in a central (x, y) area of the coil (e.g., at x=0, y=0, which represents the coils being precisely aligned with one placed exactly over the other). Displacement (e.g., misalignment) tolerance is designed into the base- and vehicle-side coils 110, 128 to allow for, e.g., driver error when the vehicle is parked. A tolerance of ±100 mm or ±150 mm is common.

The greater the displacement or offset from zero (where the two coils are aligned), the greater the losses. While greater displacements can be accommodated by making the coils wider and longer, their sizes are constrained by the footprint of the vehicle. The coil on the ground cannot be larger than the space between the wheels of a car, and there is limited space under a vehicle than can accommodate the vehicle coil. Making coils wider and longer uses more copper and more ferrite, adding both weight and cost.

Figure 4:
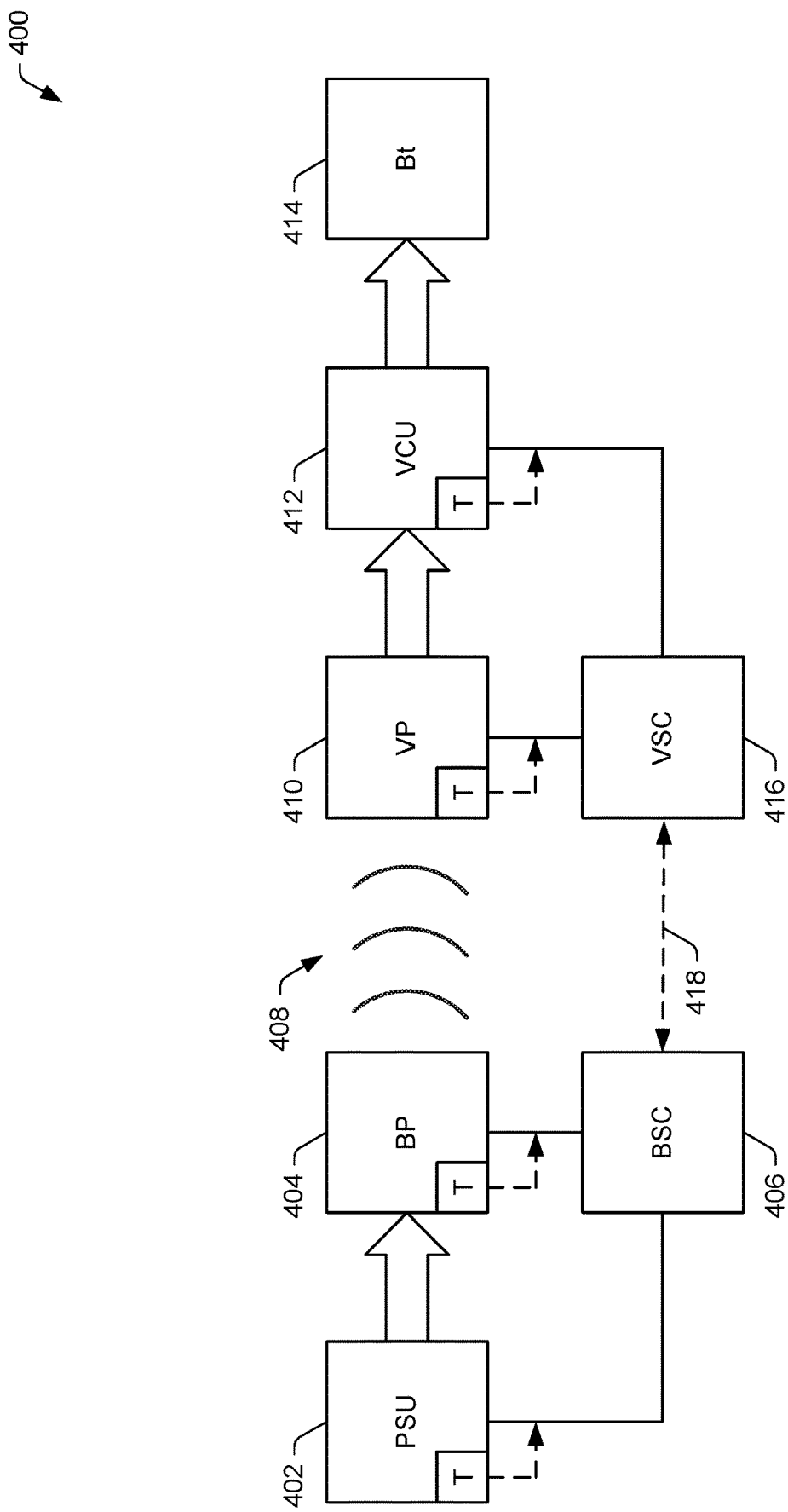
FIG. 4 is a block diagram showing operational elements of a wireless power-transfer system.

Turning now to FIG. 4, the wireless power-transfer system shown in FIG. 1 and FIG. 2 is represented in block-diagram form showing example operational elements thereof. System 400 comprises a power supply unit (PSU) 402 that delivers power to a base power-transfer apparatus (BP) 404 under the control of a base-side system controller (BSC) 406. The PSU 402 includes switching and power electronics components (not shown) that are rated to be able to handle the power passing through them. The selection of components making up the PSU 402 is therefore dependent on the power rating of the system (e.g., 3 kW, 6 kW, 11 kW, etc.) including the ability of the components to handle any losses. The base power-transfer apparatus 404 is similarly constructed with both power transfer and power losses in mind. In use, the base power-transfer apparatus (BP) 404 generates an alternating magnetic field 408 and a vehicle (not shown in FIG. 4) carrying a vehicle power-transfer apparatus (VP) 410 is positioned such that the vehicle power-transfer apparatus 410 is placed in the magnetic field 408 and receives energy therefrom.

The BSC 406 may include hardware logic components, such as, and without limitation, processor(s), microprocessor(s), Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like, with memory storing executable instructions for performing the operations described herein.

Energy received by the vehicle power-transfer apparatus 410 is converted into a current and delivered to a vehicle control unit (VCU) 412 which uses the energy therein to drive (e.g., charge) a battery (Bt) 414 or other load on the vehicle, including the battery 104 in FIG. 1. As with the PSU 402, the VCU 412 includes switching and power electronics components (not shown) that are rated to be able to handle the power passing through them. The selection of components making up the VCU 412 is therefore similarly dependent on the power rating of the system (e.g., 3 kW, 6 kW, 11 kW, etc.) including the ability of the components to handle any losses. Likewise, the vehicle power-transfer apparatus 410 is similarly constructed with both power transfer and power loses in mind.

A vehicle-side system controller (VSC) 416 controls operation of the vehicle power-transfer apparatus (VP) 410 and the vehicle control unit (VCU) 412. The vehicle-side system controller (VSC) 416 and the base-side system controller (BSC) 406 communicate via a wireless link 418 during operation to ensure that power is delivered at the required level to efficiently charge the battery 414. There are numerous different ways in which the wireless link 418 may be established. The exact manner in which control is affected by the base-side system controller 406 and vehicle system controller 416 is essentially a matter of the specifics of the system. In some designs, e.g., where cost of the vehicle-side equipment is of greatest concern, much of the control may be placed with the base-side system controller 406. In other implementations, the distribution of control may be more in the vehicle-side equipment.

The VSC 416 may include hardware logic components, such as, and without limitation, processor(s), microprocessor(s), Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like, with memory storing executable instructions for performing the operations described herein.

The system 400 also includes a number of temperature sensors T that measure operating temperatures in the system associated with the power supply unit 402, the base power-transfer apparatus 404, the vehicle power-transfer apparatus 410 and the vehicle control unit 412. These parts of the system are described by way of example because they include the power switching and electronics and the coils. Typically, it will be the operation of at least some of these parts that are most susceptible to adverse effects caused by losses in the system. Naturally, in a given system, it may be any one or more of these elements that requires the most attention or, indeed, it could be another element of the system entirely depending on the design and operational parameters.

Signals from the temperature sensors T (in each of the PSU 402, the BP 404, the VP 410 and the VCU 412) are received by the system controller elements BSC 406 and VSC 416. The system controller is configured to adjust operation of the elements of the system (including those not directly associated with a given temperature sensor) to optimize operation. It may not be necessary to provide sensors at all of these locations. Rather, depending on the requirements and design of a specific system, it may be sufficient to use only one temperature sensor. Other implementations may, e.g., only require a temperature sensor on the base power-transfer apparatus 404 and the vehicle control unit 412. Individually or together, each of the temperature sensors T provide temperature feedback that is used by the system controller 406, 416 to maintain optimum operation of the system. Thus, the system 400 is provided with one or more temperature sensors that monitor temperature during operation of the system 400, and in which operation of the system 400 is adjusted to optimize power transfer on the basis of the monitored temperature.

Placement of a sensor or sensors is governed by the component(s) whose operational efficiency is most affected by temperature. This can vary from one system design to another. Coils are susceptible to operational heating from a number of sources. A consequence of the aforementioned copper and iron losses is heating of the coil. Likewise, the hysteresis losses in the ferrite layer, and to some extent iron losses, cause heat to be generated. And, similarly, the mechanical movement (vibration) of the turns in the coil result in the conversion (loss) of energy into heat. These losses are a result of the inefficiencies of the system—the energy is lost in the form of heat. The greater the inefficiencies, the greater the heat loss and the greater the heating of the coils.

Figure 5:
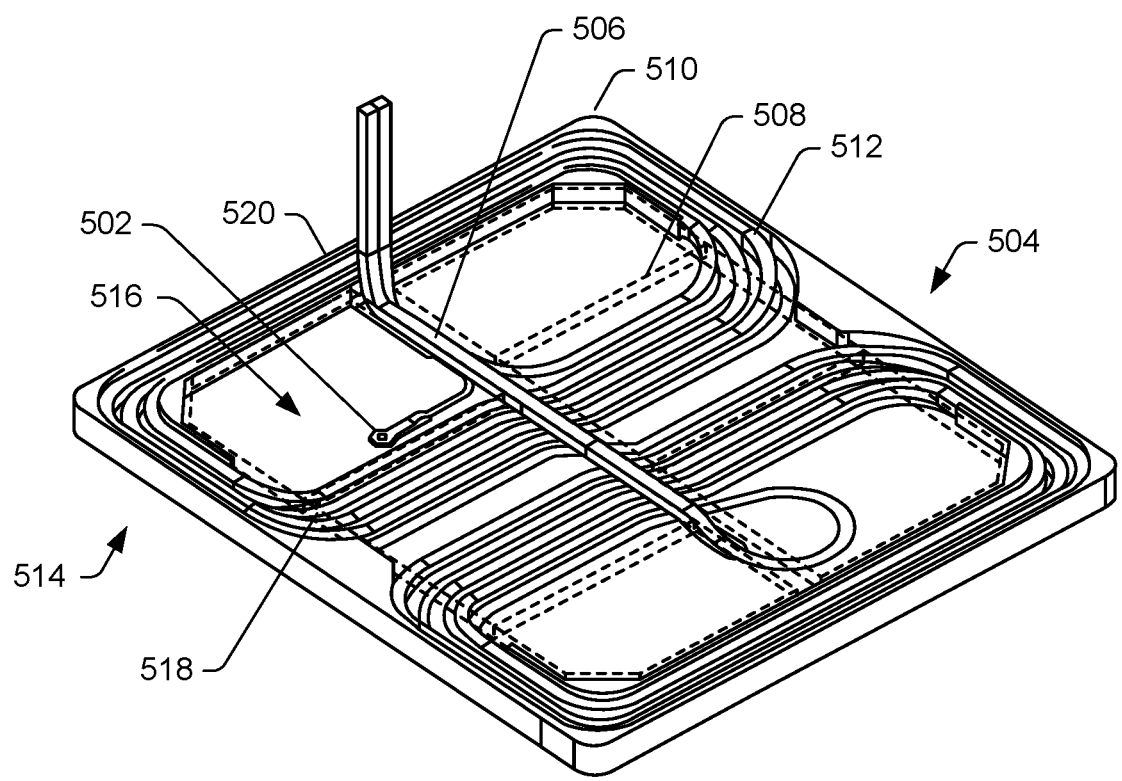
FIG. 5 is a perspective view of a portion of an example wireless power-transfer apparatus.

FIG. 5 illustrates a perspective view of portion of an example wireless power-transfer apparatus 500. The example wireless power-transfer apparatus 500 can be implemented as a vehicle power-transfer apparatus with a temperature sensor 502 placed therein. A wide range of sensors of different construction and sensing techniques are readily available. Naturally, some are more suitable than others to efficient, cost-effective operation in a WEVC environment. The sensor 502 is sufficiently robust to work reliably for the expected life of the wireless power-transfer apparatus 500. A high degree of accuracy may not be necessary since operation of the coil will usually not vary significantly between, e.g., 45° C. and 50° C. Temperature could, however, become critical at temperatures where ferrite becomes susceptible to thermal runaway. NTC (negative thermal coefficient) temperature sensors are suitable for use with a coil because their operation is not affected by a magnetic field.

The example wireless power-transfer apparatus 500 includes a coil 504 formed in a double-D configuration. However, the temperature sensor can be implemented with any suitable coil topology or configuration. As shown, the coil 504 comprises a conductor 506 placed under (in the orientation of the drawing) a ferrite layer 508 and following a convoluted path that defines the double-D form. The ferrite layer 508 is shown as dashed lines so as to reveal the conductor 506 windings underneath. The conductor 506 is held in place by a support (not shown) that may be created as any suitable non-conductive, non-magnetic material, such as a plastics molding. When implemented in the vehicle 102, the wireless power-transfer apparatus 500 may be secured under the vehicle 102 with the coil 504 furthest from the vehicle 102 (and nearest to the ground). When implemented in the base power-transfer apparatus 106, the wireless power-transfer apparatus 500 would be oriented the other way up, with the ferrite layer 508 closest to the ground and the coil 504 above it.

Typically, the conductor 506 comprises a wire, e.g., Litz wire, or cable that is configured to minimize skin effects. While Litz wire helps to mitigate copper losses, some losses remain that serve to heat the coil 504. However, in many coil designs other losses may cause the most significant heating within the power-transfer apparatus 500.

In following convoluted paths, the conductor 506 goes through various turns and bends 510, 512 of varying radii. The radius of a bend on an outer turn is larger than the radius or bend of an inner turn. Each turn or bend has the potential to create a flux hot spot, e.g., an area in which the density of the magnetic field is greater than the density at other portions of the conductor 506. These flux hot spots result in an increase in the inductance of the conductor and usually also correspond to points or areas in the wireless power-transfer apparatus 500, specifically the ferrite layer 508, where the temperature is greater.

The magnetic field also influences the ferrite and metal layers, generating currents that cause losses (heating) in those parts too. It should thus be appreciated from the foregoing that the temperature profile of a coil is dependent on a number of different variables and can vary significantly from one specific coil design to another. Accordingly, the location of the temperature sensor 502 may be based on any or all of those variables such that the temperature sensor 502 can be disposed in a "hot spot" (e.g., a high-flux density area). In some coil topologies, it may be expedient to use two or more temperature sensors at different locations within the wireless power-transfer apparatus 500.

As shown in FIG. 5, the temperature sensor 502 is placed within a coil loop 514 and proximate to (e.g., on) the ferrite layer 508 close to a central area 516 (e.g., coil window of loop 514) where turns 518 of the coil are spaced apart. For this particular configuration, this location for the temperature sensor 502 provides fairly accurate representation of the temperature of the wireless power-transfer apparatus 500. It is approximately central to the wireless power-transfer apparatus and thermally coupled with the ferrite layer, which is considered the element most susceptible to undesirable heating caused by losses during operation. Other locations may be equally useful depending on the implementation, e.g., at a corner of one of the edges where turns of the conductor are placed closer together and bend tightly or at a point 520 close to where the conductor enters/leaves the wireless power-transfer apparatus 500.

Similar considerations should be considered when placing other sensors in one or more of the other elements in the system, e.g., the power supply unit (PSU) 402, the base power-transfer apparatus (BP) 404 and the vehicle control unit (VCU) 412 shown in FIG. 4. The exact location in each of these other elements can vary. For example, a sensor may be disposed proximate to the transformer, the inverter, or the communications unit commonly provided in the PSU 402. The sensor could be presented to a current doubler or switches commonly found in the VCU 412. These elements are not shown in the drawings because the precise location where a temperature signal gives a good representation of the operational temperature of the unit is best determined during the design stage. Therefore, in the interest of brevity, the selection of locations for these other elements is not described further herein.

There are numerous different ways in which temperature information may be used to control operation of a wireless power-transfer system. Temperature may be monitored against a reference temperature, e.g., (i) a temperature value above which the equipment could create a fire risk or (ii) a temperature value below the temperature at which ferrite thermal runaway may occur. The system can then be shut down if the sensed temperature exceeds the reference value. Thus, the monitoring of temperature may be used to create a system that is safer by arranging for the system to be switched off before a hazard condition is created. Over-temperatures are less likely to create a fire risk if they can be detected and the system can be shut down before dangerous overheating occurs.

More sophisticated temperature-related operation may also be realized. For example, one requirement of an electric vehicle is that it must be able to operate anywhere from sub-freezing conditions (e.g., −20° C.) to high equatorial or desert temperatures (e.g., 50° C.). Accordingly, WEVC systems are also required be able to operate in this range of conditions. Warmer ambient temperatures make it more difficult to dissipate heat, giving less capacity for operational heating before things go wrong. Efficiency may suffer at cooler ambient temperatures, making some form of heating desirable.

Direct sunlight on a base power-transfer apparatus may also cause problems, e.g., where part of the base power-transfer apparatus is exposed to the sunlight and the rest is in shade. This is another reason why more than one sensor may be desirable for a given coil topology. Cooler ambient temperatures can also be problematic in that components, such as the power electronics in the PSU 402 and VCU 412 of FIG. 4, may not work as efficiently as they would at, e.g., room temperature. Ideally, the wireless power-transfer system should operate over a range of temperatures within which efficiency of the system is at an optimum level.

Figure 6:
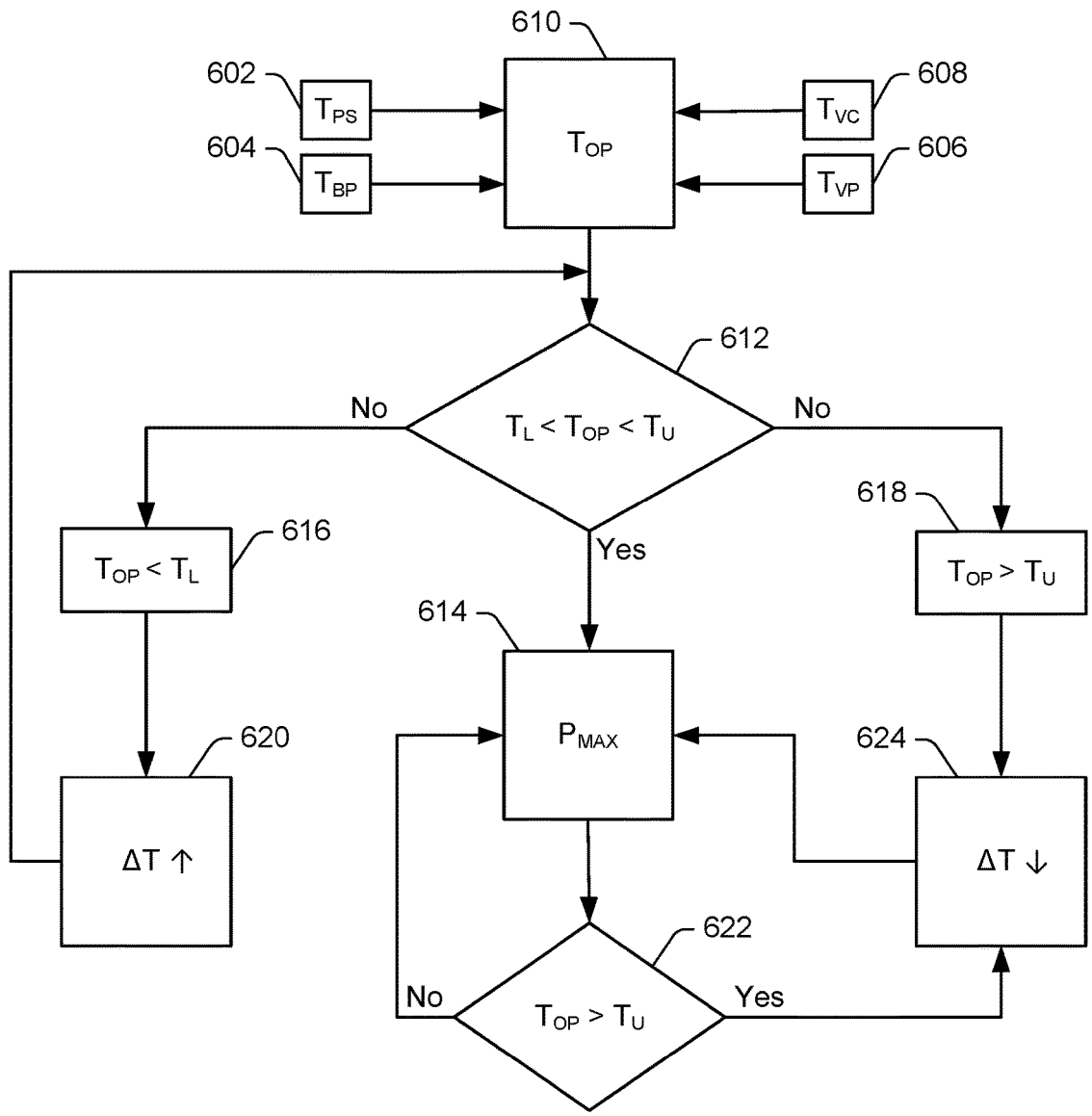
FIG. 6 is a flow chart showing a sequence of decisions made by a controller.

FIG. 6 is a flow diagram 600 that shows an example sequence of decisions made by the controller (BSC 406, VSC 416) of FIG. 4 to maintain operation of the system within a defined temperature range (e.g., defined range of temperatures). The operations shown in FIG. 6 may be performed solely in the base-side system controller 406 or the vehicle-side system controller 416, or it may be performed by both controllers working together.

The flow diagram of FIG. 6 shows the inputting of values corresponding to temperature $T_{PS}$ 602, $T_{BP}$ 604, $T_{VP}$ 606, and $T_{VC}$ 608 from the power supply unit 402, the base power-transfer apparatus 404, the vehicle power-transfer apparatus 410 and the vehicle control unit 412, respectively, shown in FIG. 4. Temperature does not usually change rapidly, and it is therefore possible to consider the temperatures one at a time. This approach requires fewer processing overheads than would be the case for parallel assessment of the values. Naturally, if the intended environment in which the system is designed to operate were to require more regular updates on temperature, parallel assessment could be carried out. The temperature under review by the controller (BSC 406, VSC 416) is represented by the value $T_{OP}$ 610, the (currently active) operational temperature.

The range of temperatures is defined by a lower temperature value $T_L$ and an upper temperature value $T_U$. Specific values of the lower temperatures depend on the operational range specified for a given system. In the following example, the desired lower temperature of operation $T_L$ is −20° C., corresponding to the coolest temperature of operation specified by a car manufacturer. Environmental temperatures below this are, of course, possible. For example, in some northern United States and in Canada winter temperatures of −40° C. or lower are not uncommon.

Figure 7:
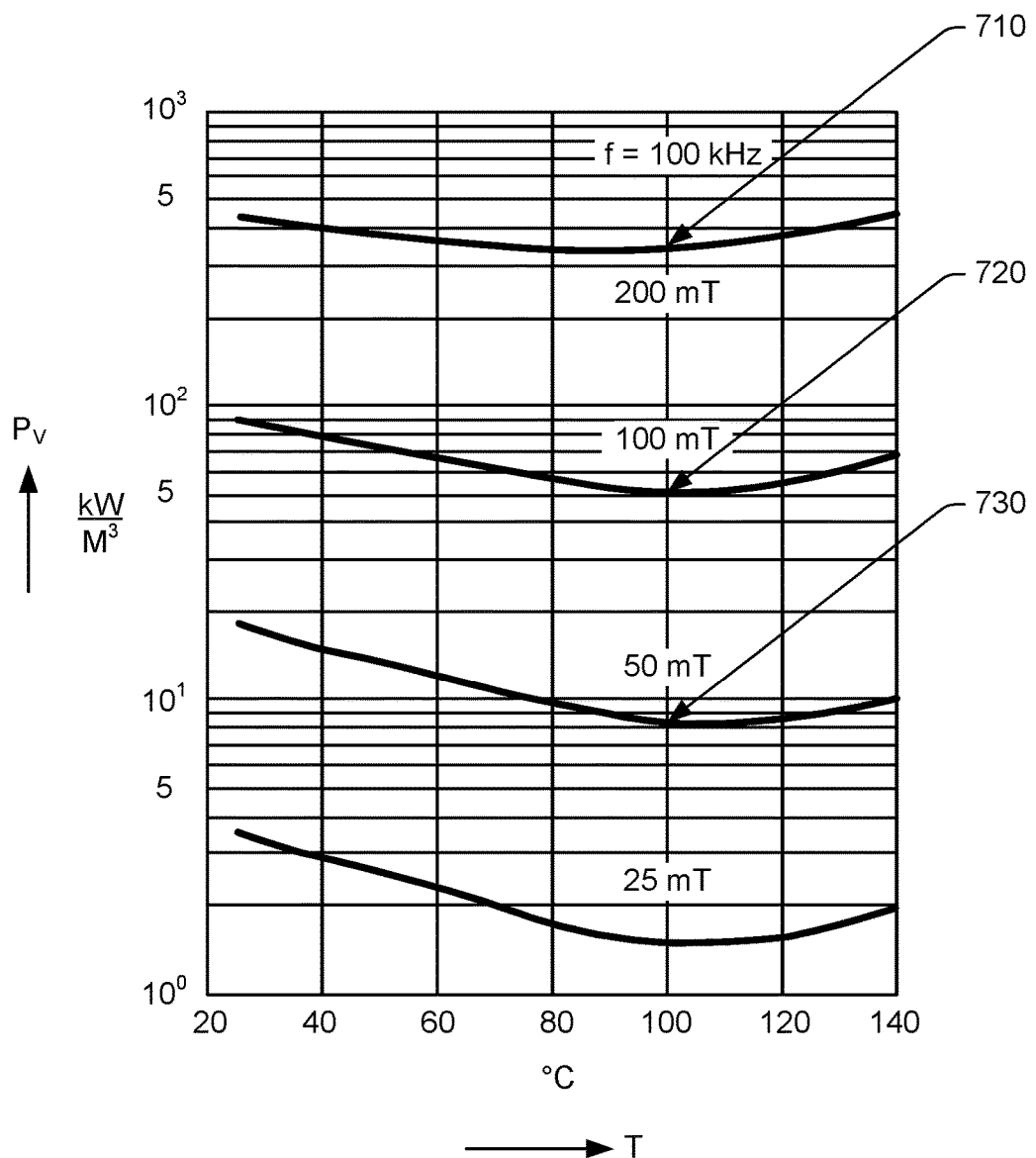
FIG. 7 is a graph showing operational characteristics of ferrite.

Also in this example, an upper temperature of operation 90° C. is used. This upper limit is chosen by way of example based on the operational characteristics of ferrite. Turning briefly to FIG. 7, a graph 700 represents relative core losses vs. temperature for a ferrite product. While this graph does not necessarily represent the characteristic behavior of a particular ferrite product, it is representative of the typical behavior of ferrite as core losses increase. As shown in graph 700 of FIG. 7, as the temperature of the ferrite increases, the related loss per volume changes.

Each of the curves includes a point of inflexion 710, 720, 730, e.g., the point where the curve begins to turn up, at around 100° C. Below these points of inflexion, the losses in the ferrite decrease as the temperature rises. Above these points of inflexion, the losses in the ferrite increases as the temperature rises. The point of inflexion corresponds to the temperature at which thermal runaway may begin, e.g., the losses increase and thermal dissipation associated with the ferrite is not sufficient to remove the additional heat.

Thermal runaway may be mitigated by thermal design in which the temperature of the ferrite is stabilized. In some instances, dissipation of heat into the surrounding air is sufficient. As long as the cooling system is able to dissipate the heat, the temperature does not rise further. However, if the cooling system is not able to dissipate the heat, further and undesirable increases may occur. A more active cooling system (e.g., water cooling) depending on the expected operating conditions. Placing a temperature sensor on the ferrite (e.g., as shown in FIG. 5) in the base or vehicle power-transfer apparatus provides greater control that enables thermal runaway and related undesirable effects to be mitigated. For example, setting an upper temperature limit, including a limit above the points of inflexion 710, 720, 730, helps to ensure thermal stability in the ferrite.

Returning to FIG. 6, the value of operational temperature $T_{OP}$ (be it $T_{PS}$ 602, $T_{BP}$ 604, $T_{VP}$ 606, or $T_{VC}$ 608) is compared at 612 with the lower and upper temperature values $T_L$ and $T_U$ to determine whether $T_{OP}$ lies between the two values, e.g., $T_L < T_{OP} < T_U$. If it does, the controller sets operation of the system to transfer full power $P_{max}$ 614 from the power supply (PSU 402) to the battery (Bt 414) or other load on the vehicle 102, as shown in FIG. 4. If, however, the temperature $T_{OP}$ is not within this range, the controller determines whether the value of $T_{OP}$ is below 616 the lower limit value $T_L$ or above 618 the upper limit $T_U$.

When the value of $T_{OP}$ is below 616 the lower limit value $T_L$, the controller 406, 416 puts the system into a warm-up mode ($\Delta T \uparrow$) 620 in which the power transferred through the system is increased. This situation may occur when the ambient temperature, e.g., the temperature of the environment in which the system is required to operate, is lower than the lower temperature limit $T_L$. One advantage of this warm-up mode 620 is that more power can be transferred to the battery 414, enabling faster charging.

Moreover, the warm-up mode ($\Delta T \uparrow$) 620 also causes operational heating by way of the aforementioned $I^2R$, hysteresis losses, and eddy currents. These generally undesirable effects can be used advantageously to bring the operating temperature into the range defined by $T_L$ and $T_U$. Indeed, in this warm-up mode, it is possible to vary such parameters as the phase angle of the signals to increase these heating effects for a limited time.

Temperature $T_{OP}$ continues to be monitored at 612. When the temperature $T_{OP}$ comes into the operating range between $T_L$ and $T_U$, operation moves out of the warm-up mode 620 and into the normal operating mode using $P_{max}$ 614. While operating in the normal operating mode, the operating temperature is monitored for overheating. When the value of $T_{OP}$ rises above the upper temperature limit $T_U$, e.g., $T_{OP} > T_U$ 622, the controller 406, 416 reduces the power transferred through the system. The system goes into a cool-down mode ($\Delta T \downarrow$) 624 in which the power transferred through the system is reduced. This reduces the various heating effects, $I^2R$, eddy currents, etc., allowing the elements of the system to cool down. Once the operating temperature $T_{OP}$ has fallen below $T_U$, the system returns to the normal operating mode using $P_{max}$ 614. Hysteresis may be added to the operation performed by the controller in the flow diagram 600 of FIG. 6 to ensure that operation does not repeatedly switch between one mode and another.

Figure 8A:
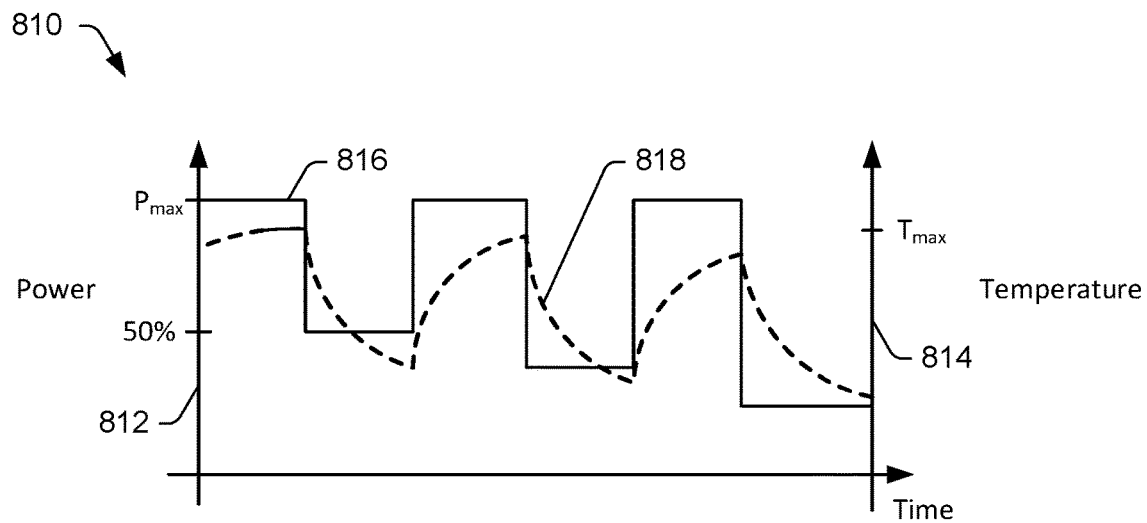
FIG. 8(a) illustrates a graph representing the system operating in a cool-down mode affecting temperature.

There are many different ways in which the power may be varied to control the operational temperature. FIG. 8(a) shows a graph 810 representing a simple example of the system operating in a cool-down mode. The scale 812 to the left of the graph represents power, and the scale 814 to the right represents temperature. As represented by the square waveform 816, the power is cycled between a nominal full power value $P_{max}$ and decreasing values of power, starting at 50% of $P_{max}$ and decreasing. This cycling of power (e.g., change of power level) serves to reduce the temperature over time as can be seen by the waveform 818.

Figure 8B:
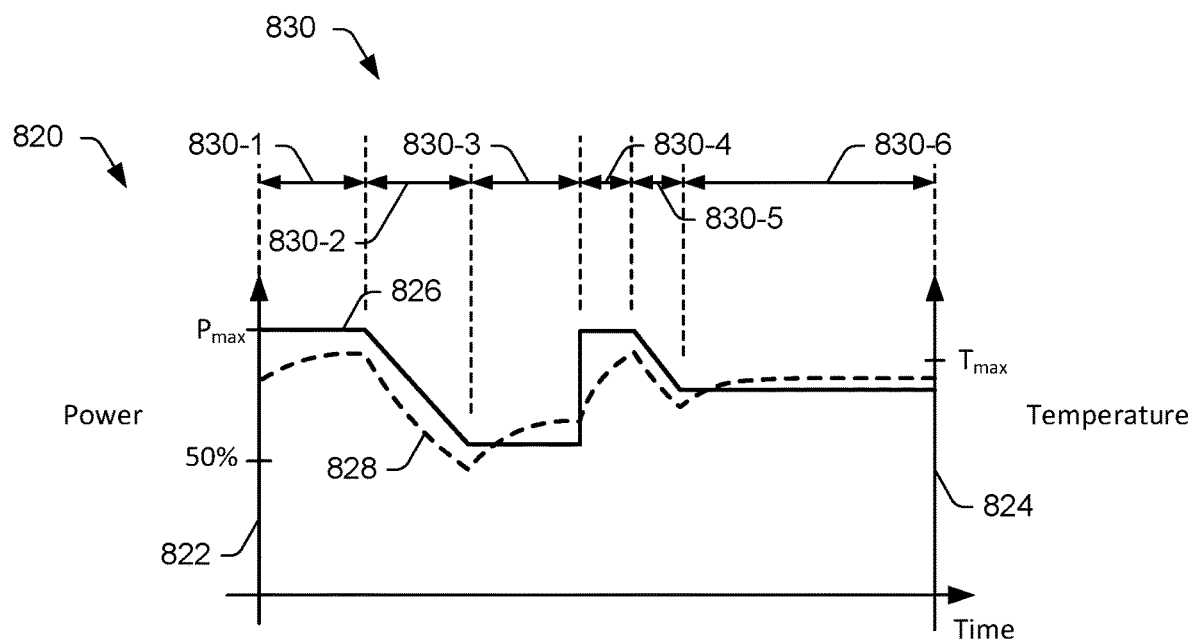
FIG. 8(b) illustrates a graph representing the system operating in an alternative cool-down mode with power adjustments affecting temperature.

In FIG. 8(b) an example of temperature tracking is represented by graph 820. The graph 820 is illustrated with intervals 830 (e.g., intervals 830-1, 830-2, 830-3, 830-4, 830-5, and 830-6). The scale 822 to the left of the graph represents power, and the scale 824 to the right represents temperature. Rather than being switched from one power level to the next—as shown in FIG. 8(a)—the power represented by waveform 826 is at full power in interval 830-1, then gradually decreases (ramps down) in interval 830-2 to a lower level (e.g., 50% power) in interval 830-3 before stepping up again to full power in interval 830-4. In interval 830-5, the power represented by waveform 826 again ramps down to a different lower level (e.g., 75% power) and maintains that level of power through interval 830-6. The temperature represented by plot 828 follows the power represented by waveform 826, falling and rising with it subject to a delay which is a function of the thermal inertia of the system.

For the avoidance of doubt, it is noted that $P_{max}$, as the name of the normal operating mode, does not necessarily imply the maximum power that can be transferred by the system. The normal operating mode using $P_{max}$ 614 represents operation at a temperature within a range from $T_L$ and $T_U$ where the monitored components, elements, and subsystems perform at an optimal level. Transfer of the absolute maximum power is possible under 'ideal' conditions. Conditions may be less than ideal, e.g., where the vehicle power-transfer apparatus is not exactly aligned with the base power-transfer apparatus. In some instances, the components and elements in a system may have to work harder, and the greater the misalignment the more likely that becomes. In practice, harder work equates to greater losses which, in turn, result in more heat being generated in the system. Vehicle position systems, where included as an ancillary to the system, help to minimize misalignment. But with human drivers, the potential for errors remains. The term $P_{max}$ is therefore the maximum or optimum power that may be transferred under the specific conditions at the time.

Usually, it is the base power-transfer apparatus 106 and vehicle power-transfer apparatus 124 that are most susceptible to heating. Varying the currents flowing in the base-side coil 110 and the vehicle-side coil 128 may reduce heating effects in one while not significantly increasing them in the other. However, varying the phase and timing of the input to the base-side coil 110 and/or output from the vehicle-side coil 128 may move the losses from the coil(s) 110, 128 to the switching and power electronics in the power supply unit 402 and/or the vehicle control unit 412. Put another way, adjusting the timing of the signals to lower $T_{BP}$ 604 and $T_{VP}$ 606 may increase the temperatures $T_{PS}$ 602 and $T_{VC}$ 608, respectively. Where the temperature of two or more elements is monitored, following the operation of the flow diagram 600 of FIG. 6, the controller may vary operation of the system to share or shift losses and spread heating effects between different components to optimize power transfer. In one example, the BSC 406 can send a communication (e.g., message via the wireless link 418) to the VSC 416 indicating that a power level of the base power-transfer apparatus 404 has been reduced and requesting that the VSC 416 increase a power level of the vehicle power-transfer apparatus 410. By adjusting the power level at both the base power-transfer apparatus 404 and the vehicle power-transfer apparatus 410, power transfer, that is at a level that is the same or higher than as before decreasing the power level of the base power-transfer apparatus 404 and before increasing the power level of the vehicle power-transfer apparatus 410, can be maintained while spreading the heating effects of power transfer. In another example, the VSC 416 can send a communication (e.g., message via the wireless link 418) to the BSC 406 indicating that the power level of the vehicle power-transfer apparatus 410 has been or will be reduced and requesting that the BSC 406 increase the power level of the base power-transfer apparatus 404. This can shift losses from the vehicle power-transfer apparatus 410 to the base power-transfer apparatus 404 and enable full power transfer to be maintained.

Although not shown, a wireless power-transfer system may also include such ancillary systems as foreign object detection (FOD) circuitry, living object protection (LOP) circuitry and vehicle positioning circuitry. Some FOD and LOP systems use coils to detect the presence of foreign or living objects in, and in the vicinity of, the magnetic field. The operation of some of these ancillary systems may itself be temperature dependent. Temperature sensors may, of course, be provided in these ancillary systems as deemed necessary or desirable. However, the resistance of copper is dependent on temperature. It is therefore possible to build into a FOD or a LOP sub-system a temperature-sensing function based on the resistance of the copper in those elements. The same principle, of course, also applies to the coils 110, 128 used in the base power-transfer apparatus 106 and vehicle power-transfer apparatus 124, respectively, magnetically to transfer energy. However, the coils in the ancillary system(s) may be used instead or in combination with the coil 110 in the base power-transfer apparatus 106 and/or the coil 128 in the vehicle power-transfer apparatus 124.

Having described the techniques herein by reference to a magnetic coil for wireless power transfer, a wireless power-transfer apparatus including a magnetic coil for wireless power transfer, a charging system including a wireless power-transfer apparatus for wireless power transfer, and a wireless electric vehicle charging system, it is to be understood that the same have been described by way of example only and that modifications and variations such as may occur to those possessed of appropriate knowledge and skills may be made without departure from the spirit and scope of the embodiments as set forth in the appended claims and equivalents thereof.

The invention claimed is:

1. A wireless power-transfer system comprising:
   a base power-transfer apparatus including a coil configured to generate a magnetic field based on an electric current;
   a power supply unit including switching and power electronics configured to drive the electric current in the coil;
   at least one temperature sensor configured to measure a temperature of the base power-transfer apparatus or the power supply unit; and
   a system controller coupled to the base power-transfer apparatus, the power supply unit, and the at least one temperature sensor, the system controller configured to:
      determine whether the measured temperature exceeds an upper temperature value of a defined temperature range; and
      responsive to the measured temperature exceeding the upper temperature value, control operation of at least one of the base power-transfer apparatus or the power supply unit based on the measured temperature to:
         reduce a power level delivered to the base power-transfer apparatus from a first power level to a second power level that is greater than zero; and
         shift losses and dissipate heat in the base power-transfer apparatus or the power supply unit.

2. The wireless power-transfer system of claim 1, wherein:
   the base power-transfer apparatus includes a ferrite layer disposed proximate to the coil; and
   the at least one temperature sensor is disposed proximate to the ferrite layer to measure a temperature of the ferrite layer during the operation of the base power-transfer apparatus.

3. The wireless power-transfer system of claim 1, wherein:
   the coil comprises a conductor that follows a path including a plurality of bends; and
   the at least one temperature sensor is positioned proximate to one of the plurality of bends.

4. The wireless power-transfer system of claim 1, wherein the at least one temperature sensor comprises a plurality of temperature sensors including a first temperature sensor disposed proximate to a ferrite layer of the base power-transfer apparatus to measure a first temperature associated with operation of the base power-transfer apparatus and a second temperature sensor disposed at the power supply unit to measure a second temperature associated with operation of the power supply unit.

5. The wireless power-transfer system of claim 1, wherein the first power level is a nominal full power value, and wherein the power level is reduced by cycling between the nominal full power value and decreasing values of power to decrease the temperature over time.

6. The wireless power-transfer system of claim 1, wherein the system controller is configured to control the operation of the base power-transfer apparatus or the power supply unit to maintain the measured temperature within a temperature range defined by the upper temperature value and a lower temperature value.

7. The wireless power-transfer system of claim 1, wherein the system controller is configured to control the operation of the base power-transfer apparatus or the power supply unit by selecting a power mode from a plurality of power modes including a warm-up mode and a cool-down mode, the system controller further configured to:
   increase power delivered to the base power-transfer apparatus from the power supply unit in the warm-up mode; and
   decrease power delivered to the base power-transfer apparatus from the power supply unit in the cool-down mode.

8. The wireless power-transfer system of claim 1, wherein the system controller is configured to control the operation of the base power-transfer apparatus or the power supply unit by varying a phase and timing of an input to the coil to shift losses from the coil in the base power-transfer apparatus to the switching and power electronics in the power supply unit.

9. The wireless power-transfer system of claim 1, wherein the system controller is configured to control the operation of at least one of the base power-transfer apparatus or the power supply unit by:
   communicating with a vehicle system controller of a vehicle power-transfer apparatus at least partially aligned with the base power-transfer apparatus;
   transmitting a request to the vehicle system controller to increase a third power level of the vehicle power-transfer apparatus to shift the losses from the base power-transfer apparatus to the vehicle power-transfer apparatus and maintain power transfer between the base power-transfer apparatus and the vehicle power-transfer apparatus that is at a level that is the same or higher than as before reducing the power level of the base power-transfer apparatus from the first power level to the second power level.

10. The wireless power-transfer system of claim 1, wherein the first power level comprises a nominal full power value and the second power level comprises approximately 50% of the nominal full power value.

11. A method of controlling power transfer between a base power-transfer apparatus and a vehicle power-transfer apparatus, the method comprising:
measuring a temperature of at least one component of the base power-transfer apparatus or the vehicle power-transfer apparatus by using at least one temperature sensor;
comparing the measured temperature to a temperature range defined by a lower temperature value and an upper temperature value;
determining that the measured temperature is greater than the upper temperature value; and
responsive to the determining, controlling operation of the at least one component of the base power-transfer apparatus or the vehicle power-transfer apparatus by reducing power delivered to the at least one component from a first power level to a second power level that is greater than zero.

12. The method of claim 11, wherein the at least one component comprises a power supply unit or a ferrite layer of the base power-transfer apparatus.

13. The method of claim 11, wherein:
the at least one component includes a coil comprising a conductor that follows a convoluted path including plural bends;
the at least one temperature sensor is disposed proximate to one of the bends; and
the method further comprises using the at least one temperature sensor to measure the temperature associated with the coil.

14. The method of claim 11, wherein the at least one component comprises a vehicle control unit or a ferrite layer of the vehicle power-transfer apparatus.

15. The method of claim 11, further comprising:
subsequent to reducing the power delivered to the at least one component, determining that the measured temperature is less than the lower temperature value; and
responsive to the determining, controlling the operation of the at least one component by increasing the power level of the at least one component from the second power level to the first power level.

16. The method of claim 11, further comprising maintaining the measured temperature within the temperature range by shifting losses to dissipate heat when the temperature exceeds the upper temperature value or when the temperature is less than the lower temperature value.

17. The method of claim 11, wherein controlling the operation of the at least one component includes selecting a power mode based on the measured temperature, the power mode selected from:
a full-power mode in which the at least one component operates with full power;
a warm-up mode in which power delivered to the at least one component is increased to cause the temperature of the at least one component to increase; and
a cool-down mode in which the power delivered to the at least one component is decreased to cause the temperature of the at least one component to decrease.

18. The method of claim 11, wherein the first power level is a nominal full power value, and wherein reducing the power delivered to the base power-transfer apparatus comprises cycling between the nominal full power value and decreasing values of power to reduce the temperature over time.

19. The method of claim 11, wherein the first power level is a nominal full power value, and wherein reducing the power delivered to the base power-transfer apparatus comprises cycling between the nominal full power value and one or more intervals of ramping down the power to reduce the temperature over time.

20. A wireless power-transfer system comprising:
a vehicle power-transfer apparatus of an electric vehicle, the vehicle power-transfer apparatus including a coil configured to convert a magnetic field into an electric current;
a vehicle control unit coupled to the vehicle power-transfer apparatus, the vehicle control unit including switching and power electronics configured to use the electric current to charge a battery of the electric vehicle;
one or more temperature sensors coupled to the vehicle power-transfer apparatus, the one or more temperature sensors configured to measure a temperature of the vehicle power-transfer apparatus; and
a system controller coupled to the vehicle power-transfer apparatus, the vehicle control unit, and the one or more temperature sensors, the system controller configured to:
determine whether the measured temperature exceeds an upper temperature value of a defined temperature range; and
responsive to the measured temperature exceeding the upper temperature value, control operation of at least one of the vehicle power-transfer apparatus or the vehicle control unit by reducing a power level delivered to the vehicle power-transfer apparatus to shift losses and spread heating effects between different components of the vehicle power-transfer apparatus or the vehicle control unit, the power level reduced from a first power level to a second power level that is greater than zero.

21. The wireless power-transfer system of claim 20, further comprising an additional temperature sensor coupled to the vehicle control unit and configured to measure an additional temperature of the vehicle control unit.

22. The wireless power-transfer system of claim 20, wherein:
the vehicle power-transfer apparatus includes a ferrite layer disposed proximate to the coil; and
the one or more temperature sensors are disposed on the ferrite layer to measure an additional temperature of the ferrite layer during operation of the vehicle power-transfer apparatus.

23. The wireless power-transfer system of claim 20, wherein the system controller is configured to:
communicate, via a wireless link, with a base-side system controller that controls operation of a base power-transfer apparatus; and
transmit a request to the base-side system controller to decrease a power level of the base power-transfer apparatus to reduce heat generated at the vehicle power-transfer apparatus.

24. The wireless power-transfer system of claim 20, wherein the one or more temperature sensors are disposed in one or more high-flux density areas of the vehicle power-transfer apparatus.

25. The wireless power-transfer system of claim 20, wherein the system controller is configured to:

subsequent to reducing the power level delivered to the vehicle power-transfer apparatus, receive a communication from a base-side system controller of a base power-transfer apparatus, the communication including a request to increase the power level delivered to the vehicle power-transfer apparatus; and in response to receiving the request, increase the power level delivered to the vehicle power-transfer apparatus from the second power level to the first power level.

26. The wireless power-transfer system of claim 20, wherein:

the coil comprises a conductor that follows a path including a plurality of bends; and the one or more temperature sensors includes a temperature sensor positioned proximate to one of the plurality of bends.

27. A wireless power-transfer system comprising:

a coil configured to generate a magnetic field based on an electric current;

ferrite disposed proximate to the coil and configured to direct the magnetic field;

a power supply unit coupled to the coil and configured to drive the coil with the electric current;

a measuring means for measuring a temperature at one or more locations on the ferrite or at the power supply; and a controlling means for varying operation of the coil or the power supply based on the measured temperature and a defined temperature range, the controlling means varying the operation in response to the measured temperature exceeding an upper temperature value of the defined temperature range by reducing a power level delivered to the coil or the power supply from a first power level to a second power level that is greater than zero.

* * * * *